United States Patent [19]

Takiguchi

[11] Patent Number: 4,494,356
[45] Date of Patent: Jan. 22, 1985

[54] PRODUCING APPARATUS FOR FISH MEAT PROCESSED FOOD

[75] Inventor: Tetsuo Takiguchi, Ube, Japan

[73] Assignee: Kabushiki Kaisha Yanagiya Tekkosho, Yamaguchi, Japan

[21] Appl. No.: 404,017

[22] Filed: Aug. 2, 1982

[30] Foreign Application Priority Data

Aug. 1, 1981 [JP] Japan .................... 56-120816

[51] Int. Cl.³ .................... A22C 7/00; A22C 25/00
[52] U.S. Cl. .................... 53/122; 53/517; 53/127; 99/441; 426/513; 426/518; 426/523; 17/32
[58] Field of Search .................... 17/32; 99/441, 427; 426/513, 517, 518, 523; 53/550, 122, 517, 530, 435, 439, 440, 127

[56] References Cited

U.S. PATENT DOCUMENTS

| | | | |
|---|---|---|---|
| 2,565,477 | 8/1951 | Crowell et al. | 53/122 X |
| 2,634,458 | 4/1953 | Elsaesser | 17/32 |
| 3,002,220 | 10/1961 | Rikhoff | 17/32 |
| 4,158,065 | 6/1979 | Sugino | 426/513 X |
| 4,303,688 | 12/1981 | Shimura et al. | 426/513 |

FOREIGN PATENT DOCUMENTS 541188  11/1941  United Kingdom ........... 426/513

*Primary Examiner*—Willie G. Abercrombie
*Attorney, Agent, or Firm*—Jordan and Hamburg

[57] ABSTRACT

Apparatus for continuously producing fish meat processed food which is produced by preparing fine filaments from paste-like fish meat and bundling a number of said filaments. The continuously producing apparatus comprises a solidification device for solidifying paste-like fish meat into thin web-like fish meat, a first cutting device for cutting the solidified fish meat lengthwise to form fine filament-like fish meat, a collection device for collecting the filament-like fish meat while transporting the same, a bundling device for successively urging and fixing filaments of the collected fish meat while transporting the same into the desired diameter, a packaging device for packaging the bundled fish meat with a packaging film, and a second cutting device for cutting the packaged fish meat into the desired axial length.

4 Claims, 9 Drawing Figures

PRODUCING APPARATUS FOR FISH MEAT PROCESSED FOOD

FIELD AND BACKGROUND OF THE INVENTION

The present invention relates to producing apparatus for food prepared by processing fish meat, and more specifically, to an apparatus for continuously producing food in which fine filaments are formed from paste-like fish meat and a number of said filaments are bundled.

Recently, there has been proposed food in which fine filaments are formed from paste-like fish meat, and a number of the filaments are collected and bundled so as to be nearly the same as leg meat of crabs or adductors. Such food is produced by thinly stretching paste-like fish meat chemically applied with a flavor of crab meat or adductors, cutting the fish meat into fine filaments, bundling a number of said filaments to have a diameter close to leg meat of crabs or adductors, and cutting the fish meat to the length of nearly the same as the leg meat of crabs or adductors. Thus, such food resembles in appearance to the leg meat of crabs or adductors, and if one eats them, each filament gives a taste like fibers of crab meat or adductors. The crab meat or adductor are less in catch and thus costly, and on the other hand, imitation food as described above are produced using fish meat which can be caught abanduntly and therefore it is possible to inexpensively provide food having a flavor close to that of crab meat or adductors. In the production of such processed food, fish meat cut into fine filaments are collected and momentarily bundled by pressing rollers or the like, and therefore, bonding of filament-like fish meat together is not sufficient so that when a sheet of packaging paper is removed, the fish meat tend to go to pieces. Also, during the step of collecting and bundling the filament-like fish meat, the fish meat are possibly torn to pieces. To improve these disadvantages noted above, elastic materials to prevent easy tearing during the production are used and subjected to chemical treatment or the like to give a viscosity thereto, thus increasing the bonding properties. Accordingly, in said proposal, fish meat as a material used is restricted and it has been difficult to provide intended food at a low cost.

The present invention overcomes these disadvantages noted above with respect to conventional fish meat processed food, and it is an object of the invention to provide a continuous producing apparatus for fish meat processed food, which can avoid application of a force of tearing off filament-like fish meat and improve the bonding condition.

In accordance with the present invention, there is provided a continuous producing apparatus for fish meat processed food, comprising a solidification device for solidifying paste-like fish meat into a thin web-like fish meat, a first cutting device for cutting lengthwise the solidified fish meat to form fine filament-like fish meat, a collection device for collecting the filament-like fish meat while transporting the same, a bundling device for successively urging and fixing filaments of the collected fish meat into the desired diameter while transporting the same, a packaging device for packaging the bundled fish meat with a packaging film, and a second cutting device for cuttting the packaged fish meat into the desired axial length. The solidification device comprises a nozzle device for stretching the paste-like fish meat into a web-like fish meat, a first endless belt device for transporting the paste-like fish meat from said nozzle device, a heating device provided on said first endless belt device to heat and solidify said paste-like fish meat, and a second endless belt device having an inlet positioned slightly spaced from an outlet of said first endless belt device to cool the solidified fish meat from the first endless belt device while transporting the same at the same moving speed as that of said first endless belt device. The bundling device comprises a lower conveyor device extended in a moving direction of the collected fish meat and having a lower supporting portion which supports the lower portion of the collected fish meat, and an upper conveyor device extended on said lower conveyor device and having an upper supporting portion for pressing the collected fish meat in a direction of the lower supporting portion while successively bearing on the upper portion of the collected fish meat.

In accordance with the preferred embodiment of the present invention, the second endless belt device of the solidification device comprises a first cooling endless belt extended on the first endless belt device and a second cooling endless belt extended slightly spaced from said first cooling endless belt, said two cooling endless belts being driven in a direction opposed to each other. With this, the solidified fish meat are transported in a zigzag fashion over the long distance, and even if the occupied area of the solidification device is reduced, the fish meat can be cooled effectively. The collection device comprises a plurality of rollers arranged spaced in a transporting direction, and a pair of conical members mounted on each roller, said conical members being arranged so that conical surfaces thereof are opposed and the distance between the opposed conical surfaces gradually decreases towards the bundling device from the collection device, said conical surfaces being brought close to each other in width to thereby collect the plurality of filament-like fish meat.

In the continuous producing apparatus for fish meat processed food in accordance with the present invention, since the distance of the transporting free portion where the paste-like fish meat heated and dried by the heating device is transferred to the cooling endless belt device is small, the paste-like fish meat is never torn off at the transporting free portion by the own weight thereof. Further, since the filament-like fish meat cut into the fine filament-like fish meat are collected and bundled without being applied with an excessive force lengthwise, th filament-like fish meat will not be torn off. In addition, the bundling device is not to bundle the filament-like fish meat momentarily as in prior arts but to bundle them by a gradually increasing urging force while taking a certain period of time, and therefore the filament like fish meat can be firmly bonded together. Moreover, the bundled fish meat are immediately packaged with a packaging film and thus the bundling effect may be further enhanced and the bundling state may be maintained. Accordingly, the fish meat processed food produced by the apparatus of the present invention has a strong bundling force the extent that they are not easily loosened and resembles to natural leg meat of crabs or adductors in cooking as well as taste. As mentioned hereinbefore, the lengthwise force is not applied to the filament-like fish meat, and therefore, fish of high quality having a high elasticity need not be used. Thus, it is possible to use cheap fish to provide processed fish meat products at a low cost.

DESCRIPTION OF THE PREFERRED EMBODIMENTS

Figure 1:
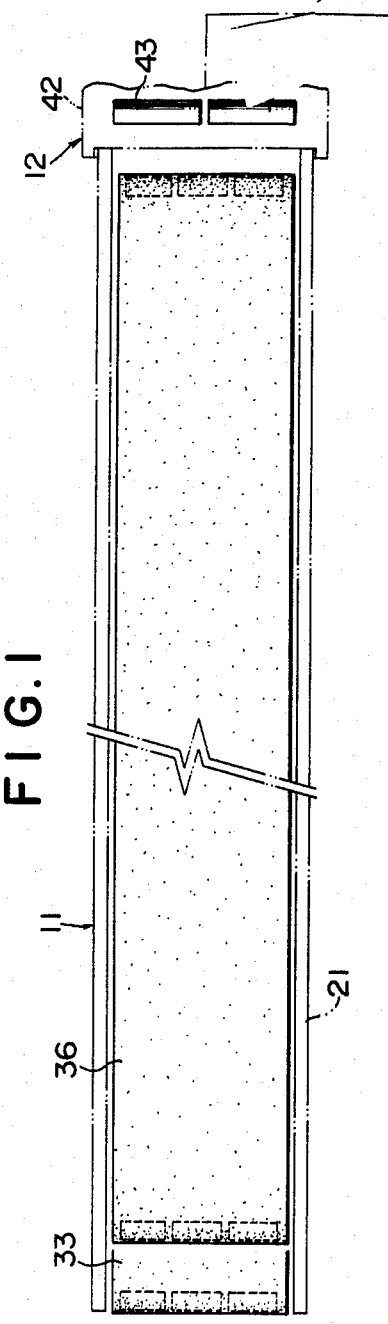
FIG. 1 is a plan view showing one embodiment of continuous producing apparatus in accordance with the present invention.
Figure 1:
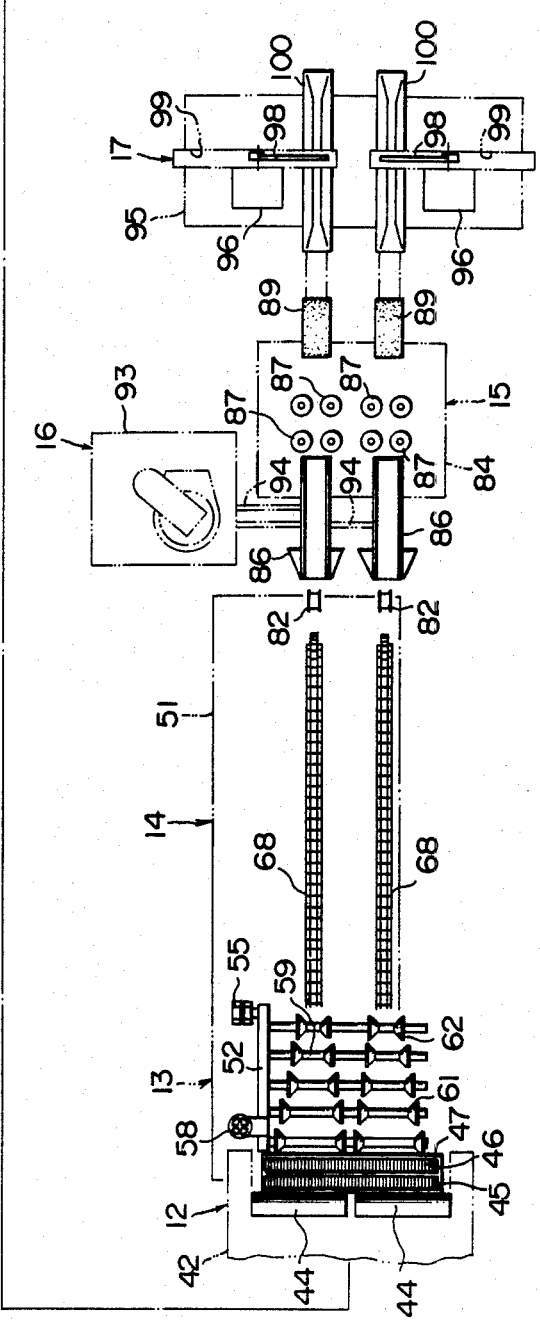
Figure 2:
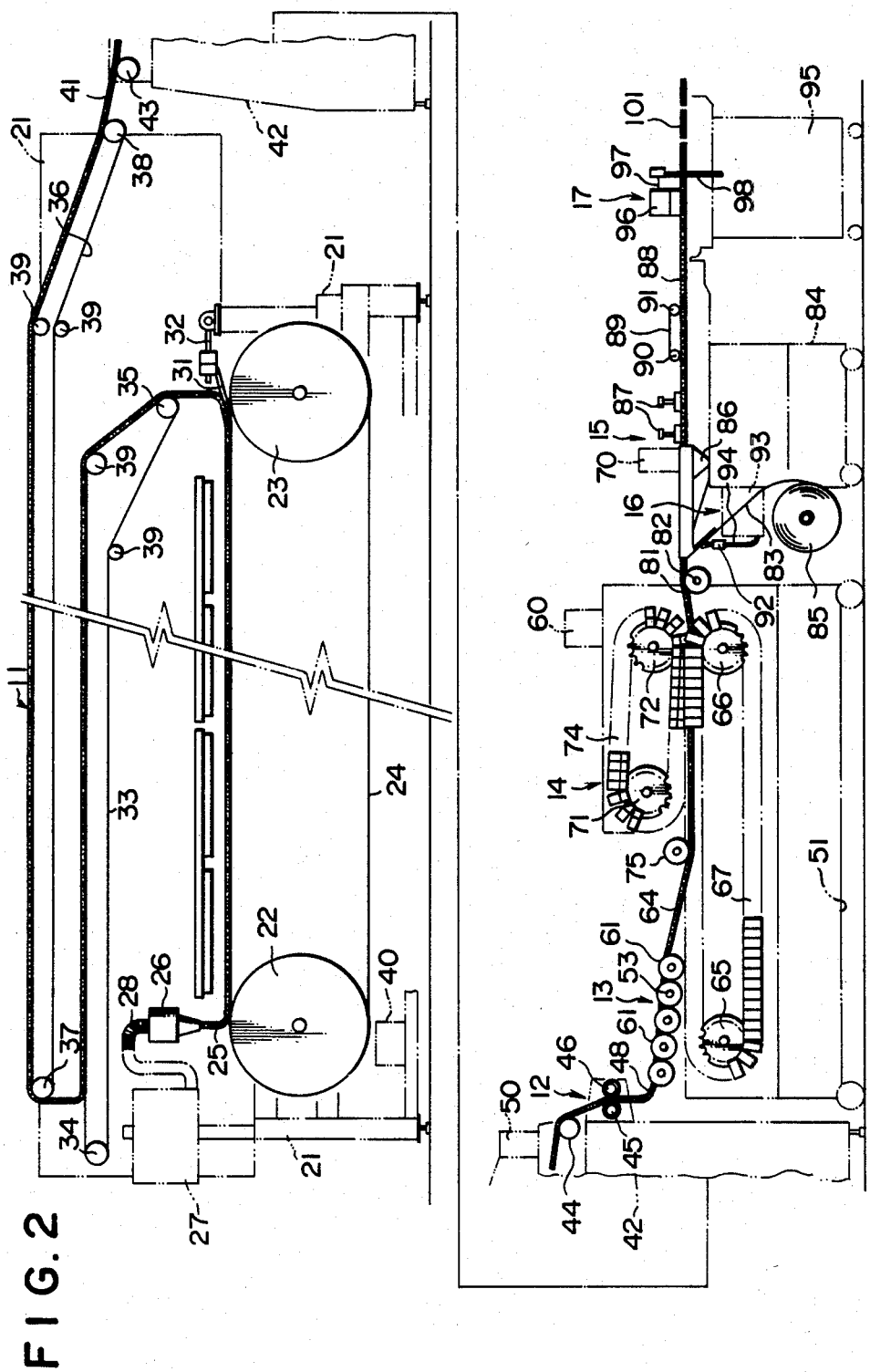
FIG. 2 is a front view of FIG. 1, also showing a flow of products to be made.
Figure 3:
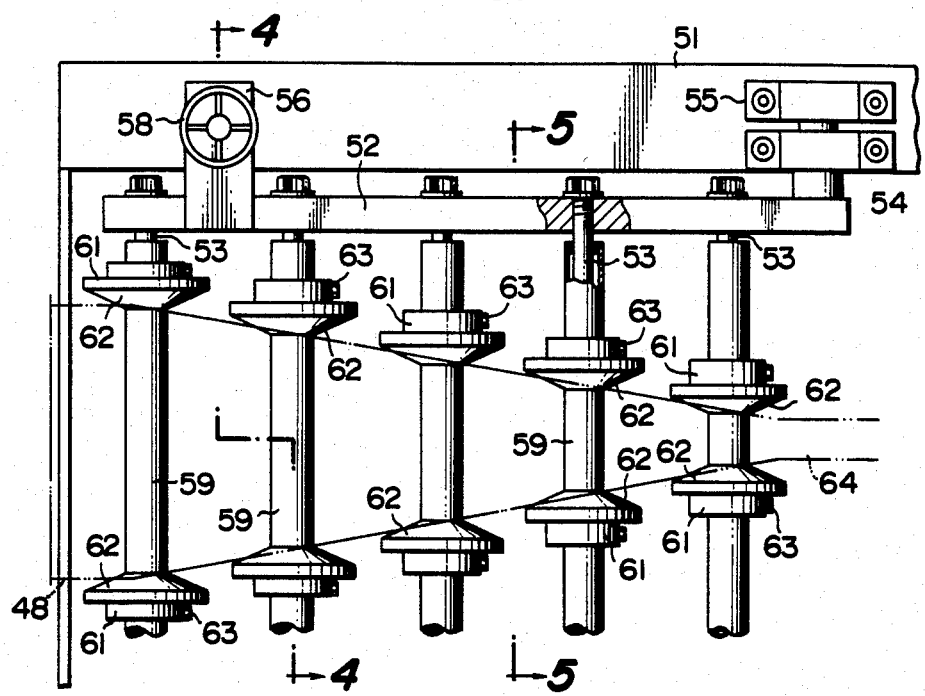
FIG. 3 is a plan view showing an essential part partially cutaway of the collection device in FIG. 1.
Figure 4:
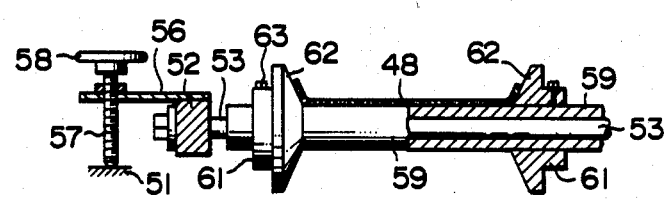
FIG. 4 is a side sectional view taken along line 4—4 of FIG. 3.
Figure 5:
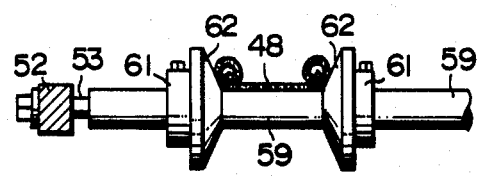
FIG. 5 is a side sectional view taken along line 5—5 of FIG. 3.
Figure 6:
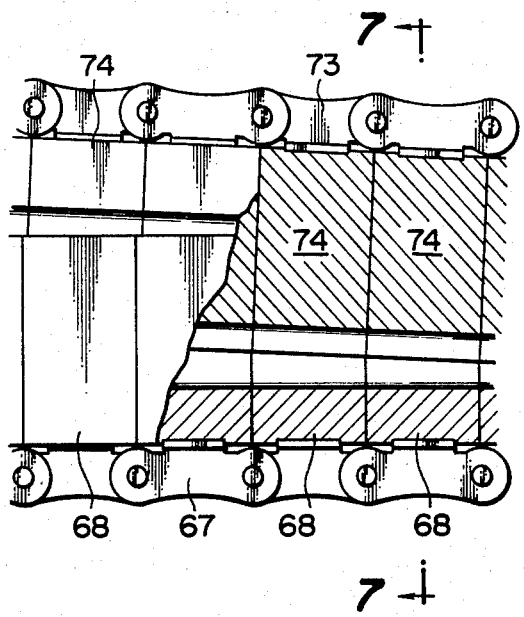
FIG. 6 is a front view of an essential part partially cutaway of the bundling device in FIG. 1.
Figure 7:
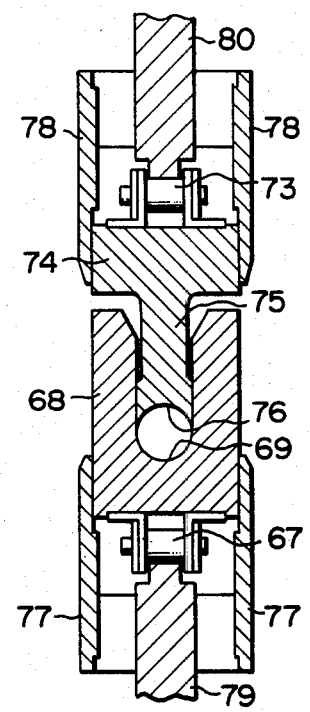
FIG. 7 is a side sectional view taken along line 7—7 of FIG. 6, also showing a guide member.

FIGS. 1 and 2 show one embodiment of a continuous producing apparatus in accordance with the present invention, by way of an example in which food of leg meat of crabs imitated by fish meat are produced. This apparatus comprises a solidification device 11 for solidifying paste-like fish meat into thin web-like fish meat with a minor water content left therein, a first cutting device 12 for cutting the solidified web-like body into a plurality of fine filament-like bodies, a collection device 13 for collecting said plurality of filaments, a bundling device 14 for urging and bundling the collected filaments, a packaging device 15 for packaging the collected filaments with a film-like packaging material with a coloring device 16 provided to apply color close to that of the surface of leg meat of crabs on the iner surface of the packaging material, and a second cutting device 17 for cutting the packaged filaments into the preselected length.

Next, the aforementioned various devices will be described in detail. The solidification device 11 comprises a pair of rolls 22, 23 rotatably mounted on a bed 21 schematically shown by two dots contour lines, and an endless belt 24 passed over between said rolls 22 and 23 and formed of heat resisting metal plates such as stainless steel, as shown in FIGS. 1 and 2. Paste-like fish meat 25 is coated in the form of a thin web on the endless belt 24 by means of a nozzle 26. The nozzle 26 is supproted on the bed 21 so as to be positioned on the inlet side in the moving direction of the endless belt 24, the nozzle 26 being connected a paste-like fish meat supply tank 27 schematically shown by the two-dot contour lines through a hose 28. The supply tank 27 is mounted on the bed 21, and the paste-like fish meat 25 within the tank is continuously supplied in a given amount to the nozzle 26 by means of a pump (not shown) or the like. Upwardly of the endless belt 24 on which paste-like fish meat 25 is coated, there is provided a heating device such as an infrared gas combustor or a hot steam heater for heating and solidifying said fish meat 25. Said heating devices 29 are arranged in plural in the moving direction of the endless belt 24 and mounted on the bed 21 by means of suitable support elements. The fish meat solidified by the heating devices 29 with a minor water content left therein are taken off from the endless belt 24 by means of a scraper 31 provided on the rear end in the moving direction of the endless belt 24. The forward end of the scraper 31 is in contact with the surface of the endless belt 24 and the rear end thereof is mounted on the bed 21 through a mounting element 32. Upwardly of the scraper 31, there is provided a first cooling endless belt 33 so that one end thereof is positioned slightly spaced. The other end of the first cooling endless belt 32 extends on the endless belt 24 in the direction of the nozzle 26. This endless belt 33 is driven by means of rolls 34 and 35 so that it may be moved at the same speed as the moving speed of the endless belt 24. Upwardly of the first cooling endless belt 33 there is provided a second cooling endless belt 36 which extends in the same direction as the extending direction of the belt 33 with a clearance slightly greater than at least the thickness of the paste-like fish meat 25, the second cooling belt 36 being moved at the same speed as that of the first cooling belt 33 by means of two rolls 37 and 38. 39 is a guide roll to control the position of the first and second cooling endless belts 33 and 36. The solidified fish meat taken away by the scraper 31 is cooled while being moved by two cooling belts 33 and 36 into web-like solidified fish meat 41, which is delivered from the rear end in the moving direction of the second cooling endless belt 36. A transporting free portion for moving paste-like fish meat from an endless belt 24 driven by a motor 40 through a gear box or the like though three endless belts are not shown to the first cooling endless belt 33 and a transporting free portion for moving fish meat being cooled from the first cooling endless belt 33 to the second cooling endless belt 36 are designed short, and fish meat is never cut by its own weight at these free portions.

The solidified fish meat 41 delivered from the second cooling belt 36 of the solidification device 11 is sent to the first cutting device 12. The cutting device 12 has guide rolls 43 and 44 rotatably mounted on a machine bed 42 and a pair of cutting rotary rolls 45 and 46. The cutting rotary rolls 45 and 46 have a plurality of edges 47 extending diametrally from the rolls 45 and 46 in a predetermined spaced relation as shown in detail in FIG. 1. The cutting rotary rolls 45 and 46 are controlled by means of a drive source 50 such as a motor which is mounted on the machine bed 42 so that it may be rotated at the same rotational speed as the moving speed of the endless belt 36 of the solidification device 11. Each edge 47 is provided to cut the web-like solidified fish meat 41 lengthwise in plural, and a spacing between the edges 47 is set to the desired width to be cut. The web-like solidified fish meat 41 from the solidification device 11 passes between the two cutting rolls 45 and 46 whereby it may be cut into a plurality of fine filaments, which filament-like fish meat 48 is sent to the collection device 13.

The collection device 13 has an arm 52 tiltably mounted on a machine frame 51 and a plurality of roller shafts 53, one of which is supported on said arm 52. The arm 52 extends from the first cutting device 12 towards the bundling device 14, the end on the side of the bundling device is mounted on one end of a supporting shaft 54, the other end of which is rotatably mounted a bearing 55 mounted on the machine frame 51. On the end of the arm 52 on the side of the first cutting device is mounted one end of a horizontal arm 56, the other end of which formed with a threaded hole, into which is fitted an inclination adjusting rod 57. The inclination adjusting rod 57 has a lower end placed in engagement with the machine frame 51, and has an upper end on which is mounted a rotatable handle 58 adapted to rotate the rod 57 to adjust the height of the horizontal arm 56. Thus, by rotation of the rotatable handle 58, the arm 56 may be inclined about the supporting shaft 54. Each roller shaft 53 has a roller 59 rotatably fitted therein. Each roller 59 has two sets of conical bodies 61 mounted thereon, each set of conical bodies having conical surfaces arranged thereon so that they may be opposed to each other. Each set of conical bodies 61 are arranged so that the opposed width of the opposed conical surfaces 62 gradually becomes narrowed towards the bundling device 14. The positional adjustment of the conical body 61 may be extremely easily accomplished by loosening a fixed screw 63 to the roller 39 mounted on the side thereof to locate it to the desired position and again tightening the fixed screw 63. That is, the collection device 13 divides the filament-like fish meat into two sets, which are narrowed in width by the conical body 61 while being moved along the roller 59. The collected fish meat 64 collected into two-bar form by the collection device 13 is sent to the bundling device 14.

The bundling device 14 has an endless chain belt 67 passed over between a sprocket 65 rotatably mounted on the machine frame 51 below the roller 59 and a sprocket 66 rotatably mounted on the end on the side of the packaging device 15 of the machine frame 51, the chain belt 67 extending substantially horizontally. The chain belt 67 has a plurality of lower frames 68 having a substantially U-shaped section continuously mounted thereon to receive the collected fish meat 64. The bundling device 14 further has an endless chain belt 73, which is driven at the same travelling speed as the of the chain belt 67, passed over between a sprocket 71 positioned substantially above the sprocket 65 and a sprocket 72 spaced from the sprocket 69 in the direction of the collection device 13 and positioned higher than the sprocket 71. The distance between the sprockets 71 and 72 is smaller than the distance between the sprockets 65 and 66. The sprockets 65, 66, 71 and 72 are driven by the motor 60 provided on the machine bed 51. On the chain belt 73 are continuously provided a plurality of upper frames 74 having a substantially T-shape, lower end of which is fitted in a V-shaped groove 69, for pressing and urging and bundling the collected fish meat 64 fed into the V-shaped groove 69 of the lower frame 68. The end of the lower end 75 of the upper frame 74 is formed along with the bottom of the U-shaped groove 69 with a recessed surface 76 so as to form the collected fish meat 64 into a substantially circle in section. Guide side plates 77, 78 are provided on the sides of the lower frame 68 and upper frame 74, respectively, and guide bottom plates 79, 80 for chains are provided on the sides opposed to the lower frame 68 and upper frame 74 of the chain belts 67 and 73. The collected fish meat 64 downwardly fed from the collection device 13 by the bundling device 14 is pressed by the upper frame 74 and inserted into the V-shaped groove 69 of the lower frame 68, said pressing force increasing in strength towards the packaging device 15, and the collected fish meat 64 is firmly urged and bundled by such face pressing action which gradually increases in strength. Thus urged and bundled fish meat 81 is transported to the next packaging device 15 through the guide roller 82.

The packaging device 15 has a set of film rolls 85 about which a thin film-like packaging film 83 made of celophane or synthetic resin and rotatably mounted on the lower portion of the machine bed 84 and a set of film guide plates 86 for guiding the packaging film 83 so as to package the bundled fish meat 81 with the packaging film 83 from the film roll 85. The film guide plate 86 is formed to have a sectional shape of substantially the same as the outside diameter of the bundled fish meat 81 as it comes towards the second cutting device 17. Thus the bundled fish meat 81 sent from the bundling device 14 is put on the packaging film 83 on the film guide plate 86 and is sent towards the second cutting device 17 together with the packaging film 83, and when the fish meat come out of the guide plate 86, the packaging film 83 is wound about the bundled fish meat 81. Eight pressing rollers 87 made of elastic material are rotatably mounted on the machine bed 84 at the end of the film guide plate 86 on the side of the second cutting device so that the axial direction thereof perpendicularly intersects with the moving direction of the bundled fish meat 81. These pressing rollers 87 comprise two sets of a pair of rollers arranged spaced to hold the packaged fish meat 88 delivered from the film guide plate 86 and are driven by a motor 70 at the same rotational speed as the moving speed of the bundled fish meat 81. Each pressing roller 87 is formed of an elastic material such as sponge or synthetic foaming resin, etc. that may be easily deformed by the packaged fish meat 88, and the packaging film 83 is positively attached to the side of the packaged fish meat 88 by said pressing roller 87. A pressing endless belt 89 is provided so as to cover the upper portions of two packaged fish meat 88 delivered from the pressing roller 87. This endless belt 89 is driven by rollers 90, 91 supported on the machine bed 84 at the rotational speed equal to the feed speed of the bundled fish meat 81 by the motor 70 through a gear box or the like. A coloring device 16 is mounted on the machine bed 84. The coloring device 16 comprises a spray gun 91 for coating a colorant resembling to a red coloring matter adhered to the surface of leg meat of crabs on a part of the inner surface of the packaging film 83, a colorant tank 92 mounted on the machine bed 84 for supplying the colorant to the spray gun, and a flexible hollow tube 94 for sending the colorant to the spray gun 91 from the colorant tank 92, the spray gun 91 being held in position by the tube 94. The pressing roller 87 can be of the free rotatable type roller which rotates as the bundled fish meat 81 moves.

Figure 8:
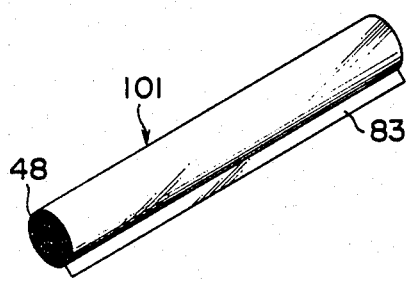
FIG. 8 is a perspective view showing one example of product produced by the present continuous producing apparatus.

The packaged fish meat 88 delivered from the packaging device 15 is cut by the second cutting device 17 into suitable length lengthwise. The second cutting device 17 comprises a motor 96 mounted on the machine bed 95 and a cutter 98 one end of which is mounted on the shaft 97 of said motor. The machine bed 95 has a groove 99 provided to allow rotation of the cutter 98 and a guide plate 100 provided to prevent the packaged fish meat 88 from being moved in its diametral direction when the packaged fish meat 88 is cut by the cutter 98. It will be easily understood that the rotational speed of the cutter 98 by the motor 96 is set according to the moving speed of the packaged fish meat 88 and what axial length of the packaged fish meat 88 would be taken. The packaged fish meat 88 is cut into the required axial length by the second cutting device 17 to obtain processed food 101. The completed processed food 101 comprises a plurality of filament-like fish meat 48 cylindrically bundled, a peripheral surface of which is packaged by the packaging film 83, as shown in FIG. 8.

Figure 9:
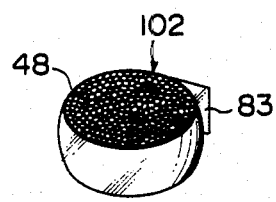
FIG. 9 is a perspective view showing the other example of a product.

Transporting free portions are respectively fromed between the endless belt 24 and the first cooling endless belt 33 and between the endless belt 33 and the second cooling endless belt 36. Thus, at the start of the continuous producing apparatus, the forward end of the paste-like fish meat 25 delivered from the endless belt 24 may be passed over the first cooling endless belt 33 while guiding said forward end by hands. Likewise, the forward end of the paste-like fish meat delivered from the first cooling endless belt 33 is passed over the second cooling endless belt 36 while guiding said forward end by hands. The transporting free end between the endless belt 24 and the first cooling endless belt 33 may be shortened by arranging the position of the roll 35 at a lower level, and the transporting free end between the first and second cooling endless belts 33 and 36 may be shortened as far as the second endless belt 36 is arranged leaving a spacing above the first cooling endless belt 32 not to impair the passage of the paste-like fish meat 25. Thus, the paste-like fish meat 25 itself dried to some extent by the heating device 29 becomes strengthened resulting in a difficulty to be torn off, and since the distance of the transporting free portion can be shortened as mentioned above, the paste-like fish meat is not torn off by its own weight at the transporting free portions. Further, by setting the respective travelling speeds of the endless belt 24, first and second cooling endless belts 33, 36, chain belts 67, 73 and pressing endless belt 89 and the respective rotational speeds of the cutting rolls 45, 46 and pressing roller 87 at the same speed, the fish meat is not torn off or contracted during the movement thereof. FIG. 9 shows fish meat processed food 102 as imitation adductors produced by the continuous producing apparatus in accordance with the present invention. While said processed food 102 has its axial length shorter than that of processed food 101 in the aforementioned embodiments, this can be adjusted by increasing the rotational speed of the cutter 98 in the second cutting device 17. In the case the diameter of the processed food 102 is made to differ from that of the processed food 101 in the aforementioned embodiments, the diameter of a circular space composed of the lower frame 68 and the upper frame 74 of the bundling device 14 may be varied. It should be noted that in the case of imitation from adductors as described, the coloring device 16 need not be provided.

What is claimed is:

1. An apparatus for continuously producing fish meat processed food in a bundled state of a number of filament-like fish meat from paste-like fish meat, the apparatus comprising:
   a solidification device for solidifying said paste-like fish meat into thin web-like fish meat, said solidification device comprising a nozzle device for stretching said paste-like fish meat into a web-like fish meat, a first endless belt device for transporting said paste-like fish meat from said nozzle device, a heating device provided on said first endless belt device to heat and solidify said paste-like fish meat, and a second endless belt device whose transporting inlet side is positioned slightly spaced from a transporting outlet side of said first endless belt device, said second endless belt cooling the solidified fish meat from said first endless belt device while transporting the solidified fish meat at the same moving speed as that of said first endless belt device;
   a first cutting device positioned on the transporting outlet side of said second endless belt device to cut said solidified fish meat lengthwise to form fine filament-like fish meat;
   a collection device for collecting said filament-like fish meat while transporting the same;
   a bundling device for urging and bundling the collected fish meat collected by said collection device, said bundling device comprising a lower conveyor device extending in a moving direction of said collected fish meat and having a lower supporting portion for supporting a lower portion of said collected fish meat and a lower conveyor device extending above said lower conveyor device and having an upper supporting portion for pressing said collected fish meat in a direction of said lower supporting portion while successively bearing on the upper portion of said collected fish meat;
   a packaging device positioned on transporting outlet sides of said upper and lower conveyors to package the peripheral surface of the bundled fish meat from said bundling device, said packaging device comprising a packaging film roll for packaging said bundled fish meat and a guide member for guiding said bundled fish meat so as to package the peripheral surface thereof while bearing the packaging film from said packaging film roll on said bundled fish meat; and
   a second cutting device for cutting the packaged fish meat packaged by said packaging device into its axial required length.

2. The apparatus for continuously producing fish meat processed food according to claim 1, wherein said second endless belt device of said solidification device comprises a first cooling endless belt device extending on said first endless belt device to transport said paste-like fish meat in a direction opposite said first endless belt device and a second cooling endless belt device extending on said first cooling endless belt device to transport said paste-like fish meat in a direction opposite said first cooling endless belt device, said first cooling endless belt having an end on a transporting inlet side thereof suspended from an end of a transporting outlet side of said first endless belt device.

3. The apparatus for continuously producing fish meat processed food according to claim 1, wherein said collection device comprises a plurality of rollers arranged spaced in a transporting direction of said filament-like fish meat and a pair of conical bodies mounted coaxial with said rollers, said pair of conical bodies being mounted on said rollers so that conical surfaces thereof may be opposed, the distance between said opposed conical surfaces being narrowed towards said bundling device from said first cutting device.

4. The apparatus for continuously producing fish meat processed food according to claim 1, wherein the lower conveyor device of said bundling device comprises a first chain belt extending substantially horizontally, and a second chain belt downwardly inclined towards said packaging device from said collection device above said first chain belt, said lower supporting portion having a plurality of lower frames arranged continuously on said first chain belt and having grooves of substantially U-shape in a transporting direction of said collected fish meat, said upper supporting portion having a plurality of upper frames arranged continuously on said second chain belt and having projections fitted in the grooves of said lower frames, said projection being formed in a forward end thereof with a recessed surface so as to form a circular space of the desired diameter by the bottom of said groove when said forward end is completely fitted in said groove, said collected fish meat being bundled in diameter substantially equal to the diameter of said circular space.

* * * * *